United States Patent
Ishihara (10) Patent No.: US 7,398,006 B2
(45) Date of Patent: Jul. 8, 2008

(54) DISC ACCESS PROCESSOR PROCESSING A RESULT OF ACCESSING A DISC AND METHOD THEREOF

(75) Inventor: Kazuhide Ishihara, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 809 days.

(21) Appl. No.: 10/842,982

(22) Filed: May 11, 2004

(65) Prior Publication Data

US 2004/0228610 A1 Nov. 18, 2004

(30) Foreign Application Priority Data

May 14, 2003 (JP) .............................. 2003-136062

(51) Int. Cl.
- *H04N 5/91* (2006.01)
- *H04N 9/79* (2006.01)
- *H04N 5/93* (2006.01)
- *H04N 7/26* (2006.01)
- *H04N 5/00* (2006.01)
- *G11B 5/09* (2006.01)
- *G11B 19/02* (2006.01)
- *G11B 11/00* (2006.01)

(52) U.S. Cl. .............................. 386/83; 386/45; 386/46; 386/52; 386/109; 386/125; 360/48; 360/49; 360/53; 360/72.1; 369/53.24

(58) Field of Classification Search .................. 386/83, 386/45, 46, 52, 109, 125, 126, 131; 360/48, 360/49, 53, 72.1; 375/E7.16; 707/104.1; 369/53.24

See application file for complete search history.

(56) References Cited

U.S. PATENT DOCUMENTS 5,381,275 A * 1/1995 Nitta et al. .................... 360/48

(Continued)

FOREIGN PATENT DOCUMENTS

JP 5-135553 6/1993

(Continued)

OTHER PUBLICATIONS

Patent Abstracts of Japan; Publication No. 2001-103407 dated Apr. 13, 2001 (1 pg.).

(Continued)

*Primary Examiner*—Thai Tran
*Assistant Examiner*—Syed Y Hasan
(74) *Attorney, Agent, or Firm*—Osha Liang LLP (57) ABSTRACT

Prior to recording, a difference between a disc's temporal, maximum recordable length and a temporal length having been consumed by recording data is calculated. A scale is determined to allow a length of a period of a preprogrammed recording to be relatively matched on a timebase bar with the obtained difference's temporal length. Relative to the length of the period of the preprogrammed recording, an amount indicating a shortage of the difference's temporal length is calculated. An image of the timebase bar is created and the determined scale is used to create on the bar an image indicating the calculated amount of shortage, and these images are integrally displayed. Furthermore, if the current recording location and time shift reproduction location are also obtained, these locations are displayed on the same timebase bar.

20 Claims, 3 Drawing Sheets

U.S. PATENT DOCUMENTS

| | | | |
|---|---|---|---|
| 5,594,598 A * | 1/1997 | Shikakura | 360/49 |
| 5,602,649 A * | 2/1997 | Shin | 386/83 |
| 5,664,087 A * | 9/1997 | Tani et al. | 345/473 |
| 6,256,453 B1 * | 7/2001 | Takano | 386/126 |
| 6,584,272 B1 * | 6/2003 | Fukushima et al. | 386/46 |
| 2002/0012530 A1 * | 1/2002 | Bruls | 386/109 |
| 2004/0128317 A1 * | 7/2004 | Sull et al. | 707/104.1 |

FOREIGN PATENT DOCUMENTS

| | | |
|---|---|---|
| JP | 5-234179 | 9/1993 |
| JP | 6-111415 | 4/1994 |
| JP | 2001-103407 | 4/2001 |
| JP | 2002-101374 | 4/2002 |

OTHER PUBLICATIONS

Patent Abstracts of Japan; Publication No. 06-111415 dated Apr. 22, 1994 (1 pg.).

Patent Abstracts of Japan; Publication No. 05-135553 dated Jun. 1, 1993 (1 pg.).

Notice of Ground of Rejection dated Jul. 5, 2005 for Japanese Application No. 2003-136062 with English Translation (4 pages).

Patent Abstracts of Japan; Publication No. 2002-101374 dated Apr. 5, 2002 (1 page).

Patent Abstracts of Japan; Publication No. 05-234179 dated Sep. 10, 1993 (1 page).

* cited by examiner

DISC ACCESS PROCESSOR PROCESSING A RESULT OF ACCESSING A DISC AND METHOD THEREOF

BACKGROUND OF THE INVENTION

1. Field of the Invention

The present invention relates generally to disc recorders recording audio or video data to a disc or disc access processors reading the data for reproduction and methods thereof, and particularly to disc access processors capable of providing a function displaying information helping a user to confirm a state of a recording or reproduction operation and methods thereof 2. Description of the Background Art Conventionally, as disclosed in Japanese Patent Laying-Open No. 2001-103407, a video recorder and player and a similar apparatus capable of recording and reproducing images, sound and the like of digital versatile discs (DVDs)-Random Access Memory (RAM) and the like have the following function: the temporal length, as scheduled, of a program to be broadcast or that of the entirety of an image recorded or reproduced is represented by using a status bar and a reproduction location or a recording location on a recording medium is visually represented by an operation symbol displayed on the status bar to help the user to confirm a state of operation.

Furthermore, Japanese Patent Laying-Open No. 6-111415 discloses that a tape's temporal capacity that remains available after a preprogrammed recording has completed is numerically indicated and the difference between the time representing the available capacity and the total of time of preprogrammed recording is calculated, and in accordance with the value of the difference a display panel has a background color changed for notification.

Furthermore, Japanese Patent Laying-Open No. 5-135553 discloses an apparatus having a function detecting and indicating an available capacity of a tape.

While the conventional apparatuses as described above can visually display current reproduction and recording locations and the like relative to the entirety of the period of reproduction and recording operations and the like and display a tape's capacity remaining available after a preprogrammed recording has completed, they do not inform the user of information of how much shortage a recording region has relative to a capacity required for recording. The user cannot recognize the amount of the shortage and the shortage of the recording region prevents normal recording.

SUMMARY OF THE INVENTION

The present invention contemplates a disc access processor and method capable of explicitly indicating an amount of shortage of a recording region in a disc used to record information.

To achieve the above object the present invention in one aspect provides a disc access processor accessing a disc to read and write at least one of video data and audio data from and to the disc and processing a result of the accessing. The disc access processor includes: a differential calculator calculating, before recording, a difference between the disc's temporal, maximum data recordable length and the disc's temporal length consumed by recording data; a scale determiner determining a scale to allow a length of a period of a preprogrammed recording to be relatively matched on a timebase bar with a temporal length of the difference obtained by the differential calculator; a shortage calculator calculating an amount of shortage of the temporal length of the difference relative to the length of the period of the preprogrammed recording; and an image creator creating an image for display. The image creator includes a bar image creator creating an image of the timebase bar, and a shortage image creator using the scale to create on the timebase bar an image indicating the amount of shortage calculated by the shortage calculator.

When data is to be recorded to a disc and the disc's temporal, maximum data recordable length minus its temporal length having been consumed by recording data provides a difference having a shortage relative to the length of the period of a preprogrammed recording, the amount of the shortage is graphically displayed. More specifically, an image is created and displayed to indicate the amount of the shortage on a timebase bar having a scale allowing the length of the period of the preprogrammed recording to be relatively matched with the difference's temporal length.

Thus the user can visually confirm a shortage of the disc's available recording capacity or region as represented in time. Furthermore, the amount of the shortage can relatively be displayed on the timebase bar to allow the user to perceive the shortage of the disc's available recording capacity or region as represented in time.

Preferably the amount of shortage is indicated by that time in the period of the preprogrammed recording at which the shortage starts as the recording proceeds. Thus the user can confirm the disc's available recording capacity, as represented in time, by a time at which the shortage starts as the recording proceeds.

Preferably the amount of shortage is indicated by an amount of a difference between a time at which the shortage starts as the preprogrammed recording proceeds and a time at which the period of the preprogrammed recording ends. Thus the user can confirm the disc's available recording capacity, as represented in time, quantatively by the amount of a difference between a time at which the shortage starts and that at which the period of the preprogrammed recording ends.

Preferably the disc access processor further includes a recording-location determiner determining while preselected data is being recorded a current recording location in the length of the period of the preprogrammed recording, wherein the image creator further includes a recording-location image creator creating an image indicating on the timebase bar the current recording location determined by the recording location determiner.

Thus the user can be informed of the current recording location together with the aforementioned amount of shortage on the same timebase bar. While data is being recorded the user can visually recognize how much is left before the shortage starts.

Preferably when the preselected data is being recorded the shortage calculator periodically calculates the amount of shortage.

An amount of shortage can periodically be obtained. If a background process for a data recording process is performed to delete data, a recordable region resulting from the deletion can be used to calculate the latest amount of shortage. Thus the user can constantly confirm an accurate amount of shortage.

Preferably the disc access processor further includes a display unit displaying the image created by the image creator.

Preferably the disc access processor further includes a reproduction location determiner determining in data recorded in the disc and time shift reproduced a location of a portion of the data currently time shift reproduced, wherein the image creator also has reproduction location image creator creating an image indicating on the timebase bar the location of the portion of the data determined by the reproduction location determiner.

Thus in recording data to a disc when a reproduction portion time shift reproduces a portion of recorded data, the currently time shift reproduced portion of data is displayed on a timebase bar so that it is indicated in the recorded data.

Thus the currently time shift reproduced portion of data can be located as it is confirmed on a timebase bar in a displayed image.

To achieve the above object the present invention in still another aspect provides a method of accessing a disc to read and write at least one of video data and audio data from and to the disc and processing a result of the accessing, including the steps of: prior to recording, calculating a difference between a maximum temporal length allowing the disc to record data and a temporal length of data having been recorded to the disc; determining a scale to allow a length of a period of a preprogrammed recording to be relatively matched on a timebase bar with a temporal length of the difference obtained at the step of calculating the difference; calculating an amount indicating a shortage of the temporal length of the difference relative to the length of the period of the preprogrammed recording; and creating an image for display, the step of creating including the steps of creating an image of the timebase bar and using the scale to create on the timebase bar an image indicating the amount of shortage calculated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present invention in embodiment will be described with reference to the drawings. Hereinafter exemplified as a recording medium is a disc recording medium provided on a disc and randomly accessible and video information is recorded thereto for the sake of illustration, although information to be recorded is not limited to video information and may be audio information.

Figure 1:
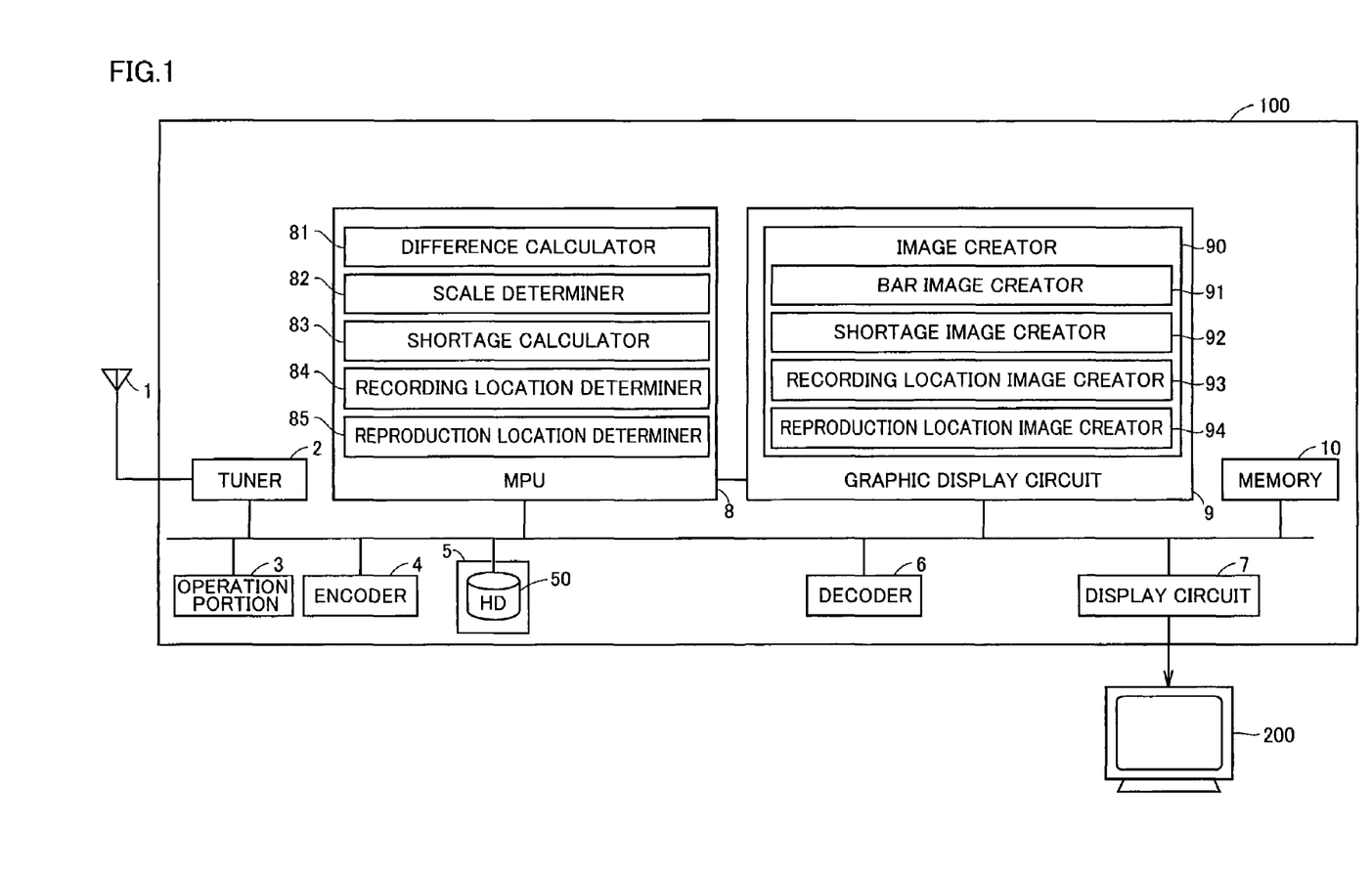
FIG. 1 shows a configuration of a disc recording and reproduction apparatus of the present invention in an embodiment.

FIG. 1 shows a configuration of a disc recording and reproduction apparatus applied to an embodiment of the present invention. In FIG. 1, a disc recording and reproduction apparatus 100 has an antenna 1 and a television (TV) receiver 200 externally connected thereto and internally includes a tuner 2, an operation portion 3, an encoder 4 for example for motion picture experts group (MPEG), a hard disk (HD) device 5 having an HD 50 and recording data to HD 50 and reading data from HD 50 for reproduction, a decoder 6 for example for MPEG, a display circuit 7, a microprocessing unit (MPU) 8, a graphic display circuit 9 and a memory 10.

MPU 8 controls and monitors an operation of each of the other components. MPU 8 has a differential calculator 81, a scale determiner 82, a shortage calculator 83, a recording-location determiner 84, and a reproduction location determiner 85. These components of MPU 8 correspond to a function implemented as a program read by MPU 8 from memory 10 and executed thereby. These components functions, as will be described later.

Graphic display circuit 9 has an image creator 90 creating graphic data of a variety of images displayed on TV receiver 200 via display circuit 7, and outputs created graphic data to display circuit 7. Image creator 90 includes a bar image creator 91, shortage image creator 92, a recording location image creator 93, and a reproduction location image creator 94. Each component of image creator 90 creates graphic data based on information provided from MPU 8. While image creator 90 and each component thereof herein have their functions implemented by circuit, they may have their functions implemented in the form of program.

Disc recording and reproduction apparatus 100 operates, as will be described hereinafter. Initially will be described how it operates to allow a user to view a TV broadcast. Initially a broadcasting station transmits a TV signal which is in turn received by antenna 1 and output to tuner 2. The TV signal is received by tuner 2, which extracts from the received TV signal a TV signal of a channel to be viewed (at least one of video and audio signals). The extracted TV signal is output via display circuit 7 to TV receiver 200 to allow the user to view an image and hear sound.

When the user operates operation unit 3 to change a channel, a signal indicating this change is transmitted to MPU 8. MPU 8 receives the signal and responsively requests tuner 2 to change the channel and simultaneously uses graphic display circuit 9 to output to display circuit 7 graphic data of an image indicating a channel number. Memory 10 is used as a temporary storage device when MPU 8 performs a process. Display circuit 7 superimposes a signal of the image received from graphic display circuit 9 on a video signal of the TV signal of the channel extracted by tuner 2, and outputs the same to TV receiver 200.

To record an image an operation is performed, as will be described hereinafter. Initially a broadcasting station transmits a TV signal which is in turn received by antenna 1 and output to tuner 2. The TV signal is received by tuner 2, which in turn extracts from the received TV signal a video signal of a channel to be recorded. The extracted video signal is converted by encoder 4 to digital data which is in turn recorded to HD device 5 at HD 50.

To reproduce a video signal recorded in HD 50 an operation is performed as described hereinafter. HD device 5 reads from HD 50 digital data which is in turn decoded by decoder 6 to a video signal which is in turn displayed on TV receiver 200 via display circuit 7 in the form of an image.

In the present embodiment if disc recording and reproduction apparatus 100 is operated to record data to HD device 5 at HD 50 and a time shift reproduction mode is also turned on (or activated), designating any partial region of HD 50 having been consumed by recording data allows an operation to be performed to reproduce recorded data from the designated partial region. While this reproduction operation is performed, HD device 5 reads data from HD 50 and in parallel records to the HD the data of an image based on a received broadcast signal.

Reference will now be made to the FIG. 2 flow chart to describe a method of displaying a state of recording and reproduction of an image for HD 50. Note that when recording to HD 50, an image recorded to HD 50 can also be displayed by TV receiver 200 in parallel for the sake of illustration.

Figure 2:
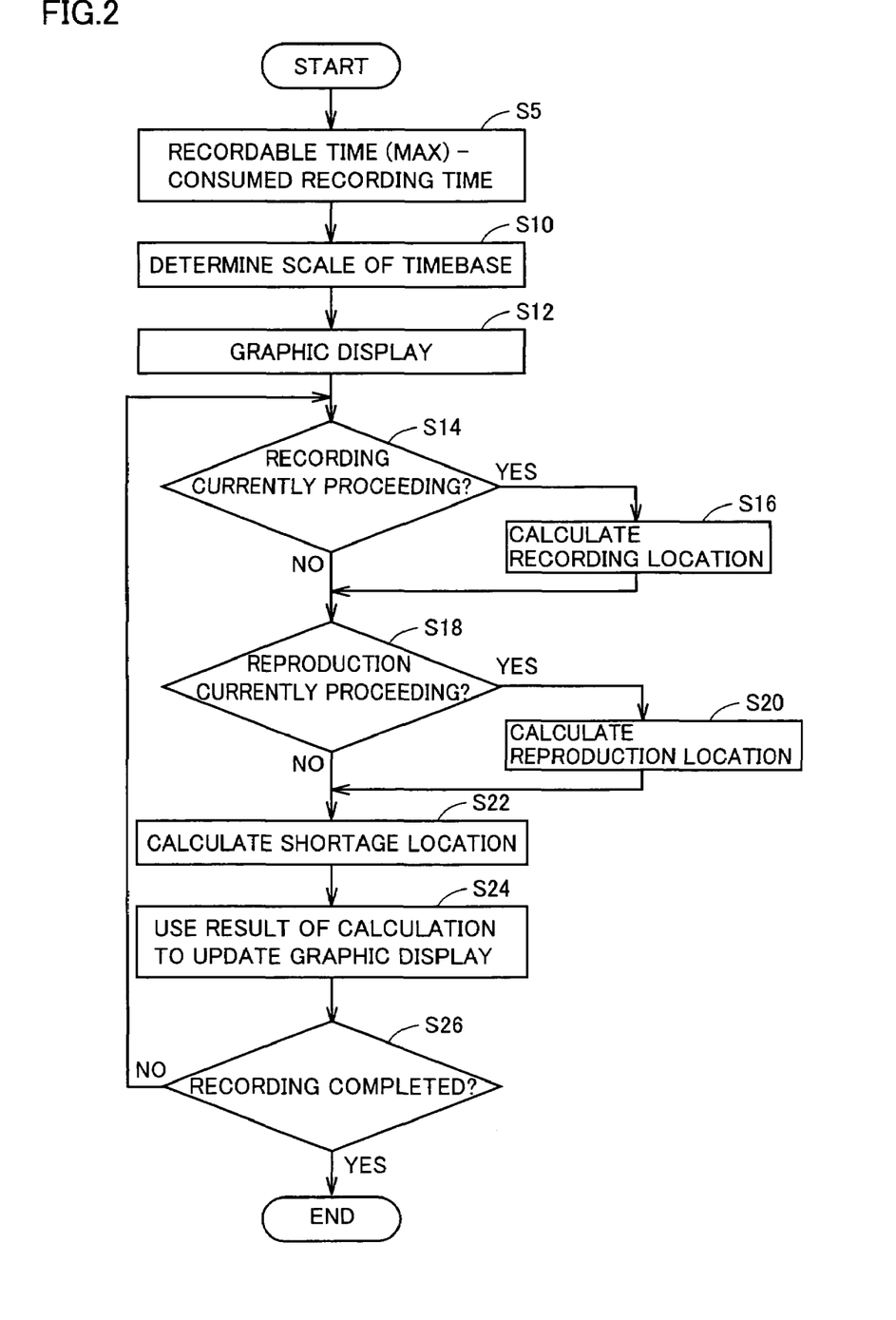
FIG. 2 is a flow chart representing a procedure of a process performed to display a video recording and reproduction state.

Initially, disc recording and reproduction apparatus 100 is powered on and a recording and reproduction operation is available for the sake of illustration, and when a recording is preprogrammed the FIG. 2 routine is initiated. The FIG. 2 process is effected as controlled by MPU 8. FIGS. 3A-3D exemplarily show an image of an indication.

Initially, differential calculator 81 obtains in accordance with information of the preprogrammed recording (whether the recording mode is a standard play mode or an extended play mode accommodating three-fold recording) the difference between the HD 50 temporal, maximum recordable length and the HD 50 temporal length having been consumed by recording video data (step (S)5). Note that when the standard play mode for example allows a recording region of a prescribed capacity to record video data corresponding to broadcasting for one hour, the extended play mode allows the recording region of the same capacity to record video data corresponding to broadcasting for three hours.

Then, scale determiner 82 determines a scale of a timebase to allow preselected content (the preprogrammed recording's temporal length) to be relatively matched with the obtained difference's temporal length on the timebase (S10). Information of the determined scale is output to graphic display circuit 9.

Figure 3A:
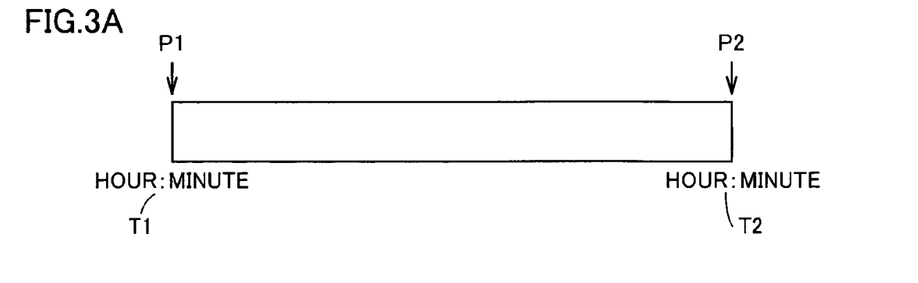
FIGS. 3A-3D show exemplary indications displayed in accordance with the FIG. 2 procedure.

Then, as shown in FIG. 3A, graphic data of an image indicating a bar corresponding to the timebase is created in graphic display circuit 9 by bar image creator 91. The created graphic data is fed via display circuit 7 to TV receiver 200 which in turn displays an image based on the graphic data (S12).

Note that in FIG. 3A the bar has one end corresponding to a point P1 indicating a time (hour and minute) at which the preprogrammed recording starts, and the other end corresponding to a point P2 indicating a time (hour and minute) at which the preprogrammed recording ends. For example if at S5 a difference of two hours is obtained and a preprogrammed recording takes a time (a difference in time between points P1 and P2) of one hour then the ratio of the difference to the preprogrammed recording's time is 1:2. Accordingly at S10 this ratio is used to determine a scale of the bar of FIG. 3A. In FIG. 3A, data T1 and T2 indicate times at which a recording starts and ends, respectively, and the data are included in information output from scale determiner 82.

Then MPU 8 determines whether a recording is currently proceeding in accordance with information of the preprogrammed recording (S14). If so (YES at S14) then recording location determiner 84 calculates in accordance with the determined scale and determines the current recording location, i.e., a location on the FIG. 3A bar that corresponds to a time having elapsed since the recording started and as it proceeds, or point P1 (S16). Furthermore from the calculated and determined location a time (hour and minute) corresponding to that location is also calculated. Then, the process proceeds with S18, as described hereinafter.

If MPU 8 determines that recording is currently not proceeding (NO at S14), MPU 8 then determines whether recorded video data is being reproduced, i.e., whether the aforementioned time shift reproduction is being performed (S18). If so (YES at S18) then reproduction location determiner 85 calculates and determines the current reproduction location as a location on the FIG. 3A bar in accordance with the determined scale (S20). Furthermore, the time corresponding to the determined reproduction location is also calculated in accordance with the scale.

If time shift reproduction is currently not proceeding (NO at S18), then shortage calculator 83 calculates the shortage in capacity of the current recordable region relative to a recording region required for recording in accordance with the mode for the preprogrammed recording, and calculates a relative location on the bar from point P2 that corresponds to the shortage in capacity (S22). The calculated, relative location indicates a shortage location indicating a location at which recording capacity runs short as recording proceeds.

Subsequently, information used to create an image of an indication used to indicate on the FIG. 3A bar the recording, reproduction and shortage locations calculated as described above, i.e., an image indicating each location and that indicating a time corresponding thereto is provided to graphic display circuit 9 and received by recording location image creator 93, reproduction location image creator 94 and shortage image creator 92, respectively, and each component uses the information to create graphic data. The created graphic data is provided via display circuit 7 to TV receiver 200 which in turn uses the data to graphically display an image (S24). Thus the displayed image is superimposed on the image displayed on TV receiver 200 and is displayed on a screen for example at a peripheral portion. It should be noted, however, that it may be displayed on the screen at a different location. MPU 8 then determines whether the recording is completed (S26) and if not MPU 8 returns to S14. If MPU 8 determines that the recording is completed MPU 8 completes the FIG. 2 process.

Figure 3B:
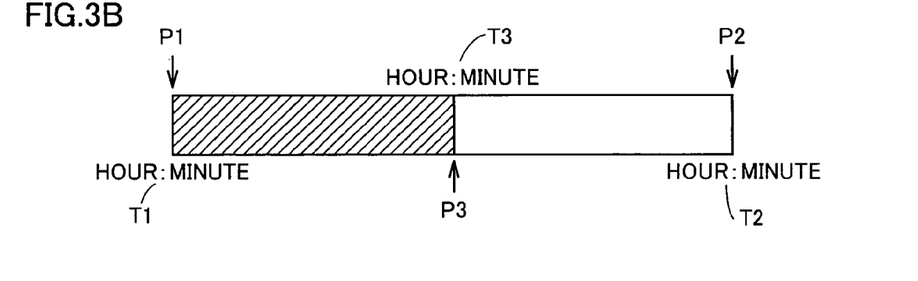

Thus if recording alone is proceeding (time shift reproduction is not proceeding and there is no shortage in capacity) bar image creator 91 and recording location image creator 93 are used to graphically display an indication as shown in FIG. 3B. More specifically, a calculated recording location on the bar is indicated at point P3 and the portion on the bar that covers from point P1, a location at which a recording starts, to point P3, the current recording location, is for example colored and thus explicitly displayed. The current recording time (hour and minute) indicated by data T3 calculated to correspond to point P3, is also displayed. Data T3 is included in information output by recording location determiner 84.

Figure 3C:
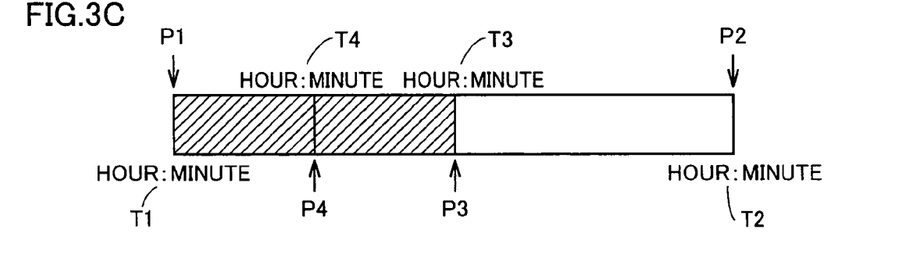

Furthermore when time shift reproduction is proceeding, bar image creator 91, recording location image creator 93 and reproduction location image creator 94 are used to provide an indication as shown in FIG. 3C. As shown in FIG. 3C, together with point P3 a point P4 is also indicated. Point P4 indicates on a bar a time at which data read by time shift reproduction is recorded, and the time (hour and minute) of reproduction corresponding to point P4 is also indicated at data T4. Data T4 is included in information output by reproduction location determiner 85.

Figure 3D:
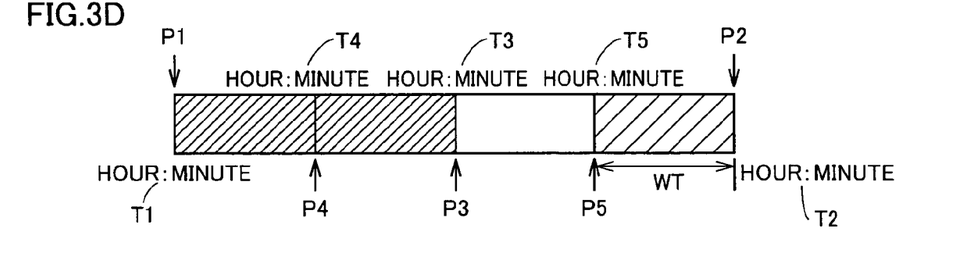

Furthermore, if a result of a calculation reveals that the HD's recording region has a shortage in capacity then bar image creator 91, shortage image creator 92, recording location image creator 93 and reproduction location image creator 94 are used to provide an indication as shown in FIG. 3D. A shortage location is indicated at a point P5, as shown in FIG. 3D. Point P5 indicates by a displacement with reference to point P2 the portion of a preprogrammed recording's time that cannot be covered by the time of a difference obtained at S5. At point P5, a time (hour and minute) at which capacity runs short and recording can no longer be allowed is also indicated by data T5. Furthermore in the bar the portion between points P5 and P2 is displayed by a color different from that of points P1-P3. The fact that there is a shortage in capacity, i.e., a shortage in capacity of a recordable region relative to a capacity required to record the data of a preprogrammed recording, can visually be indicated.

Furthermore by confirming a time (hour and minute) indicated at point P5 by data T5 the user can confirm, as seen in the period of a preprogrammed recording, a time at which a recordable region runs short and recording can no longer allowed, and the unrecordable length as represented in time. Data T5 is included in information output by shortage calculator 83.

Furthermore, time value data WT may also be displayed. Data WT indicates in value a difference in time between points P2 and P5. A user can confirm the data WT value to specifically confirm an unrecordable length as represented in time. Data WT is included in information output by shortage calculator 83.

MPU 8 then returns to S14 and repeats the subsequent procedure similarly. By such repetition, S22 is performed each time, since for HD 50 while a recording process is performed a background process can be performed such as deleting recorded data from HD 50, and a shortage location indicated by point P5 varies in flux as data is deleted. If recorded data is not deleted in parallel with a recording process, S22 is only required initially only once.

While the FIGS. 3A-3D images are unconditionally displayed for the sake of illustration, whether they should be displayed or not may be switched and set by a user operating operation portion 3, as prescribed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc access processor accessing a disc to read and write at least one of video data or audio data from and to the disc and processing a result of said accessing, comprising:
   differential calculation means calculating, before recording, a difference between said disc's temporal, maximum data recordable length and said disc's temporal length consumed by recording data;
   scale determination means determining a scale to allow a length of a period of a preprogrammed recording to be relatively matched on a timebase bar with a temporal length of said difference obtained by said differential calculation means;
   shortage calculation means calculating an amount of shortage of said temporal length of said difference relative to said length of said period of said preprogrammed recording; and
   image creation means creating an image for display, said image creation means including bar image creation means creating an image of said timebase bar, and
       shortage image creation means using on said timebase bar said scale determined by said scale determination means to create an image indicating said amount of shortage calculated by said shortage calculation means;
   wherein the image indicates the amount of shortage on the timebase bar on the scale allowing the length of the preprogrammed recording to be relatively matched with the temporal length of the difference.

2. The disc access processor of claim 1, wherein said amount of shortage is indicated by that time in said period of said preprogrammed recording at which said shortage staffs as said recording proceeds.

3. The disc access processor of claim 2, wherein
   said amount of shortage is indicated by an amount of a difference between a time at which said shortage staffs as said preprogrammed recording proceeds and a time at which said period of said preprogrammed recording ends.

4. The disc access processor of claim 3, further comprising recording-location determination means determining while preselected data is being recorded a current recording location in said length of said period of said preprogrammed recording, wherein
   said image creation means further includes recording-location image creation means creating an image indicating on said timebase bar said current recording location determined by said recording location determination means.

5. The disc access processor of claim 4, wherein when said preselected data is being recorded said shortage calculation means periodically calculates said amount of shortage.

6. The disc access processor of claim 5, further comprising display means displaying said image created by said image creation means.

7. The disc access processor of claim 6, further comprising reproduction location determination means determining in data recorded in said disc arid time shift reproduced a location of a portion of said data currently time shift reproduced, wherein
   said image creation means also has reproduction location image creation means creating an image indicating on said timebase bar said location of said portion of said data determined by said reproduction location determination means.

8. The disc access processor of claim 2, further comprising recording-location determination means determining while preselected data is being recorded a current recording location in said length of said period of said preprogrammed recording, wherein
   said image creation means further includes recording-location image creation means creating an image indicating on said timebase bar said current recording location determined by said recording location determination means.

9. The disc access processor of claim 2, wherein when said preselected data is being recorded said shortage calculation means periodically calculates said amount of shortage.

10. The disc access processor of claim 2, further comprising display means displaying said image created by said image creation means.

11. The disc access processor of claim 2, further comprising reproduction location determination means determining in data recorded in said disc and time shift reproduced a location of a portion of said data currently time shift reproduced, wherein
   said image creation means also has reproduction location image creation means creating an image indicating on said timebase bar said location of said portion of said data determined by said reproduction location determination means.

12. The disc access processor of claim 1, wherein
   said amount of shortage is indicated by an amount of a difference between a time at which said shortage starts as said preprogrammed recording proceeds and a time at which said period of said preprogrammed recording ends.

13. The disc access processor of claim 12, further comprising recording-location determination means determining while preselected data is being recorded a current recording location in said length of said period of said preprogrammed recording, wherein
   said image creation means further includes recording-location image creation means creating an image indicating on said timebase bar said current recording location determined by said recording location determination means.

14. The disc access processor of claim 12, wherein when said preselected data is being recorded said shortage calculation means periodically calculates said amount of shortage.

15. The disc access processor of claim 12, further comprising display means displaying said image created by said image creation means.

16. The disc access processor of claim 1, further comprising recording-location determination means determining while preselected data is being recorded a current recording location in said length of said period of said preprogrammed recording, wherein
    said image creation means further includes recording-location image creation means creating an image indicating on said timebase bar said current recording location determined by said recording location determination means.

17. The disc access processor of claim 1, wherein when said preselected data is being recorded said shortage calculation means periodically calculates said amount of shortage.

18. The disc access processor of claim 1, further comprising display means displaying said image created by said image creation means.

19. The disc access processor of claim 1, further comprising reproduction location determination means determining in data recorded in said disc and time shift reproduced a location of a portion of said data currently time shift reproduced, wherein
    said image creation means also has reproduction location image creation means creating an image indicating on said timebase bar said location of said portion of said data determined by said reproduction location determination means.

20. A method of accessing a disc to read and write at least one of video data and audio data from and to the disc and processing a result of said accessing, comprising the steps of
    prior to recording, calculating a difference between a maximum temporal length allowing said disc to record data and a temporal length of data having been recorded to said disc;
    determining a scale to allow a length of a period of a preprogrammed recording to be relatively matched on a timebase bar with a temporal length of said difference obtained at the step of calculating said difference;
    calculating an amount indicating a shortage of said temporal length of said difference relative to said length of said period of said preprogrammed recording; and
    creating an image for display, the step of creating including the steps of creating an image of said timebase bar, and using said scale to create on said timebase bar an image indicating said amount of shortage calculated;
    wherein the image indicates the amount of shortage on the timebase bar on the scale allowing the length of the preprogrammed recording to be relatively matched with the temporal length of the difference.

* * * * *

UNITED STATES PATENT AND TRADEMARK OFFICE
CERTIFICATE OF CORRECTION

PATENT NO. : 7,398,006 B2
APPLICATION NO. : 10/842982
DATED : July 8, 2008
INVENTOR(S) : Kazuhide Ishihara Page 1 of 1

It is certified that error appears in the above-identified patent and that said Letters Patent is hereby corrected as shown below:

In Claim 2, column 7, line 60, the word "staffs" should be --starts--.

In Claim 3, column 7, line 64, the word "staffs" should be --starts--.

In Claim 7, column 8, line 19, the word "arid" should be --and--.

Signed and Sealed this

Eleventh Day of November, 2008

JON W. DUDAS
*Director of the United States Patent and Trademark Office*